Patented Dec. 3, 1946

2,412,072

UNITED STATES PATENT OFFICE 2,412,072

METHOD OF GASSING RUBBER

Roger Charles Bascom, Port Clinton, Ohio, and Dudley Roberts, deceased, late of New York, N. Y., by Dudley Roberts, Jr., executor, New York, N. Y., assignors to Rubatex Products, Inc., New York, N. Y., a corporation of Delaware No Drawing. Original application August 19, 1937, Serial No. 159,910. Divided and this application June 12, 1942, Serial No. 446,772

1 Claim. (Cl. 260—725)

Our invention relates to a method of producing gas expanded closed cell plastic structures and more specifically relates to a method of gassing and expanding rubber by means of a mixture of carbon dioxide and nitrogen, and the article produced thereby.

In the prior practice in this art it has been found extremely difficult and expensive to gas rubber or rubber-like materials to produce a gas expanded structure. Certain inert gases have been suggested, such as nitrogen, helium, and carbon dioxide. Each of these gases specifically has disadvantages which render it either difficult to use or detrimental to the finished product. Thus, nitrogen is difficult to inject into rubber because of its low solubility with rubber. On the other hand, it has the desirable property of remaining in the cellular structure and supporting the expanded mixture, when once it is introduced, because of its insolubility in the rubber. In addition to this insolubility in the rubber, the partial pressure of nitrogen present in the air that normally surrounds such a structure, makes it less likely, according to physical gas laws, for such nitrogen to diffuse outwardly from the mixture.

With respect to helium, expense is the primary objection. The gas is at present so expensive that its commercial use is impractical.

Carbon dioxide, in contrast to nitrogen, can be readily introduced into a rubber structure since it has a high degree of solubility with rubber. Its cost is relatively low. On the other hand, its high solubility in the rubber and the comparative lack of carbon dioxide in the atmosphere that normally surrounds the structure causes an almost complete diffusion into the air of the carbon dioxide from the cellular structure after the material has been expanded and exposed to the air.

With regard to the tendency of a gas enclosed in a sealed rubber structure to escape therefrom, the factors of primary importance are the partial pressure of the gas in the cell and the pressure of the same gas in the surrounding atmosphere. This regulates the tendency of the gas, according to physical laws to establish an equilibrium in pressure through the membrane that separates the two different concentrations of gases. The speed of the passage of the gas through the wall is regulated by the solubility of the gas in the medium that composes the wall, e. g., rubber.

More specifically, it can be seen that according to these precepts it is highly desirable to incorporate nitrogen gas in a rubber structure as a finished article and at the same time it is far more difficult to incorporate nitrogen than a correspondingly more soluble but less desirable gas such as carbon dioxide.

According to the process of our invention we avail ourselves of the desirable properties of difficultly permeable gases and eliminate the undesirable effects which ordinarily accompany the use of soluble gases.

More specifically, we employ a mixture of carbon dioxide which is extremely soluble in the rubber and penetrates quickly therein, and nitrogen which is insoluble in the rubber but is quickly carried therein by the carbon dioxide. The nitrogen, when once incorporated within the rubber has little tendency to diffuse out from the structure to cause a collapse. This has been one of the serious defects of the process in the prior art.

In this use of a mixture of carbon dioxide and nitrogen gases, when an external application of the gas mixture is used to gas the rubber, the carbon dioxide acts as a carrier for the nitrogen and by reason of its solubility in the rubber carries the nitrogen along with it into the rubber under less pressure than would ordinarily be needed if nitrogen alone were used.

In the past it has been necessary to gas under a pressure of 4,000 pounds per sq. in. of nitrogen. To develop such a pressure, high pressure pumps have been used. Such pumps are very costly. The gassing autoclaves needed to hold such pressures must be of great strength and involve the use of heavy walls and lids. Not only does such high pressure apparatus occupy a large amount of space by reason of its necessary bulk but its cost maintenance is exceedingly high. For example, the gassing autoclave alone has an initial cost of about $5,000.

According to our invention we can employ a pressure of 1,500 pounds per square inch. As is obvious to any engineer, when the pressure involved in the operation is reduced from 4,000 pounds per square inch to 1,500 pounds per square inch, the apparatus involved can be greatly simplified and the cost of such apparatus greatly reduced. As will be pointed out hereafter such cost reduction is of vital importance in this industry.

The manufacture of expanded rubber is a new industry. It has been forced to compete with other materials which, although inferior in desirable characteristics such as waterproofness, strength, resiliency and insulating values, are far lower in cost. The problem of reducing manufacturing costs so that competition with regard to price range is more even, is the primary problem of the industry. Hard board gas expanded rubber, for example, is splendidly adapted as a construction element in low cost housing by reason of its unique and valuable properties. Because of its high cost of production however, it has been just above the necessary price range. The present process set forth herein is a material step in lowering manufacturing costs to enable the use of this material in low cost housing.

When the gas is applied internally of the rubber in the form of chemicals adapted to react or decompose under influences such as heat to evolve carbon dioxide and nitrogen, the carbon dioxide again serves as a unique agent to obtain a greater expansion of the rubber than nitrogen alone could effect.

Carbon dioxide has a far greater expanding power than nitrogen. However, when used alone, it will diffuse out of the rubber into the air for the reasons discussed before. Thereupon, the expanded structure collapses and is useless. When a mixture of nitrogen and carbon dioxide is used, the carbon dioxide gives the rubber the desired great expansion and the nitrogen maintains the expanded structure after the carbon dioxide has diffused out. Thus it can be seen that when internal gas evolution is used, the mixture of carbon dioxide and nitrogen again has an unusual and valuable result.

Similarly, a combination of external and internal gassing may be employed. The particular desired properties of each gas can be used as indicated above.

Accordingly, it is an object of our invention to provide a new method of producing gas expanded rubber.

Another object of our invention is to produce a method of efficiently gassing the rubber structure.

Another object of our invention is to gas rubber by means of a mixture, a carrier gas and a sustaining gas.

Another object of our invention is to gas rubber by means of a mixture of a gas relatively soluble in rubber and a gas relatively insoluble in rubber.

Another object of our invention is to gas rubber by means of a mixture of carbon dioxide and nitrogen.

Another object of our invention is to provide a new process of gassing rubber using a low pressure and a comparatively short period of time.

A special illustration of the composition and the method for carrying out the process of our invention is as follows:

I. Soft rubber mix

| | Parts by weight |
|---|---|
| Smoked sheets of rubber | 50 |
| Whole tire reclaim rubber | 100 |
| Zinc oxide | 4 |
| Whiting | 50 |
| Sulphur | 3 |
| Phenylbetanaphtha-amine | 1 |
| Paraffin wax | 3 |
| Diphenylguanidine | 0.5 |

II. Hard rubber mix

| | Parts by weight |
|---|---|
| Smoked sheets of rubber | 50 |
| Whole tire reclaim rubber | 100 |
| Zinc oxide | 4 |
| Sulphur | 50 |
| Diphenylguanidine | 0.5 |

The above compounds have different ingredients and different sulphur contents to produce a hard or soft rubber absorption, as may be desired. The smoked rubber is thoroughly masticated upon rolls. To this is added the reclaimed rubber. Immediately thereafter there is incorporated the zinc oxide, whiting, paraffin wax, phenylbetanaphtha-amine and diphenylguanidine. Immediately after blending these above ingredients, sulphur is added to the rubber mix.

These materials are thoroughly incorporated in the rubber on the rolls and the rubber is then allowed to rest in a cool dark place for a period of about 24 hours.

This serves to allow the molecular structure of the rubber to restore itself to its normal position. The violent working of the rubber on the rolls appears to disarrange by the spiral or extended molecular structure of the rubber and affect certain of its desirable properties.

It has been found that superior results and improved properties in the final structure are obtained by the use of this rest period.

After the modifiers have been incorporated in the rubber mix and the rubber has been thoroughly rested, it is shaped on a suitable forming machine such as an extruder or calender. The so-shaped structure is then placed into a gassing chamber and subjected to a gas pressure of a mixture about equal percentages of carbon dioxide and nitrogen with an individual pressure of about 750 pounds per square inch of each and a total pressure of 1,500 pounds per square inch.

After the rubber mix has been thoroughly impregnated with this gas, the pressure is released and the mix is taken out and placed in suitable molds. There it is subjected to a vulcanizing heat which acts to completely expand the gas enclosed in the rubber and consequently the rubber structure itself, and also to vulcanize the rubber to a final cure.

The rubber dough can be given a preliminary vulcanization or partial cure before gassing, or concurrently with the gassing. This is in order that the rubber structure itself will be sufficiently rigid or set to prevent the escape of the enclosed gas.

Specifically with regard to the gas mixture that is to be employed in our process, we take a mixture of gas that is soluble in the structure to be permeated, as for instance, carbon dioxide and a gas that is relatively insoluble in such a structure, as for instance, nitrogen. When it is desirable to impregnate rubber, the pressure will be of the order of 750 pounds of carbon dioxide and 750 pounds of nitrogen effecting a total pressure of 1,500 pounds per square inch. The unusual advantages of the mixture of the above indicated nature lies in the fact that whereas a greater pressure is needed to expand the structure, a greatly reduced gas pressure is necessary to maintain such structure when it is set.

Thus, while the foregoing gas mixture affords a total pressure of 1,500 pounds per square inch, there is introduced to the rubber a 750 pound pressure both of carbon dioxide and nitrogen, the pressure of 750 pounds of nitrogen being sufficient to maintain the expanded structure after the carbon dioxide, which has served as a penetrating carrier for the nitrogen, has efficiently expanded the rubber and then has diffused out of the structure into the atmosphere as pointed out above.

The action of the mixture of the gases produces entirely new and unexpected results that are far beyond the expected properties resulting from a mixture of gases. The combination of quick penetration and high expansion together with the retention of the expanded structure because of the nitrogen contained therein, effects a gas process that is far more efficient than the previous processes of this art.

It has been a custom to use pressures of nitrogen at 4,000 pounds per square inch. According to this invention, we may use a gassing process with a total pressure of 1,500 pounds per square inch. As is evident, the cost of gassing under higher pressures increases rapidly as greater pressures become necessary. The reduced pressure of 1,500 pounds per square inch which we employ here not only materially reduces the cost of the manufacture of gas expanded rubber but obtains results superior to those achieved when 4,000 pounds per square inch of nitrogen is used.

A greater expansion is obtained by reason of the carbon dioxide gas component than when nitrogen is used alone and a stronger structure with little tendency to collapse by reason of the nitrogen gas component is obtained than when carbon dioxide is used alone. Thus materially superior results in addition to economy of operation are effected by the use of the mixture of gases.

The method may be carried out using a mixture of externally applied carbon dioxide and nitrogen gas or the equally beneficial results may be obtained by incorporating in the rubber mix chemicals which react or decompose to evolve a carbon dioxide gas. The nitrogen gas component may be introduced by external penetration.

An alternative method of incorporating the mixture of the gas within the structure resides in the incorporation of chemicals adapted to react or decompose to produce carbon dioxide, as for instance, ammonium carbonate; and chemicals adapted to react or decompose to produce nitrogen, as for instance, diazoaminobenzene, or ammonium chloride and sodium nitrite.

When this combination of gas is used the carbon dioxide supplies the expanding forces within the structure and the nitrogen acts to support the expanded structure after the carbon dioxide has diffused out therefrom.

It can thus be seen that the combination of a carrier and expanding gas such as carbon dioxide or ammonia of high permeability in the rubber structure to be gas impregnated, and a gas such as nitrogen or helium which is miscible with the carrier gas and can by its nature be retained in the gas structure after the high soluble carrier gas has diffused out, can achieve superior results to any single gas.

The particular pressures and proportions of the gases set forth are by way of example only. An extremely wide range has been investigated and found effective for the purpose indicated.

We wish to be limited only as set forth in the claim.

This application is a division of Serial No. 159,910, filed August 19, 1937, issued as Patent No. 2,286,230 on June 16, 1942.

We claim:

A gas expanded rubber comprising closed cells, said closed cells containing a non-oxiding mixture of nitrogen and ammonia.

DUDLEY ROBERTS, JR.,
*Executor of the Last Will and testament of Dudley Roberts, Deceased.*
ROGER CHARLES BASCOM.